United States Patent
Joosten

(10) Patent No.: US 6,330,302 B1
(45) Date of Patent: Dec. 11, 2001

(54) METHOD OF AND DEVICE FOR FORMING AN IMAGE OF AN OBJECT FROM PLURALITY OF IMAGES

(75) Inventor: Johannes H. M. Joosten, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/469,333

(22) Filed: Dec. 22, 1999

(30) Foreign Application Priority Data

Dec. 22, 1998 (EP) .................................................. 98204388

(51) Int. Cl.[7] ........................................................ H05G 1/64
(52) U.S. Cl. .......................... 378/98.12; 378/96; 378/97; 378/108; 378/175
(58) Field of Search ............................... 378/175, 96, 97, 378/108, 98.12

(56) References Cited

U.S. PATENT DOCUMENTS

| | | | |
|---|---|---|---|
| 3,854,049 | * 12/1974 | Mistretta et al. | 250/402 |
| 3,904,874 | * 9/1975 | Amtmann et al. | 250/314 |
| 3,974,386 | * 8/1976 | Mistretta et al. | 250/402 |
| 4,479,231 | * 10/1984 | Haendle et al. | 378/99 |
| 5,436,952 | 7/1995 | Haendle et al. | 378/98.7 |
| 5,710,801 | * 1/1998 | Dillen et al. | 378/98.7 |

FOREIGN PATENT DOCUMENTS

0806175A2   11/1997  (EP) ............................... A61B/6/00

* cited by examiner

*Primary Examiner*—Robert H. Kim
*Assistant Examiner*—Courtney Thomas
(74) *Attorney, Agent, or Firm*—John F. Vodopia

(57) ABSTRACT

A method of and a device for forming an image of an irradiated object in which images are formed with different exposure levels and the differently exposed images are combined so as to form a single image. The device includes a source and an imaging device which is connected to the source in order to form the image, the imaging device being arranged to form images with different exposure levels and being provided with an image processor in which the differently exposed images are combined so as to form the single image. The device produces images of a quality which is comparable to that of images acquired by means of a device having a much larger dynamic range.

13 Claims, 1 Drawing Sheet

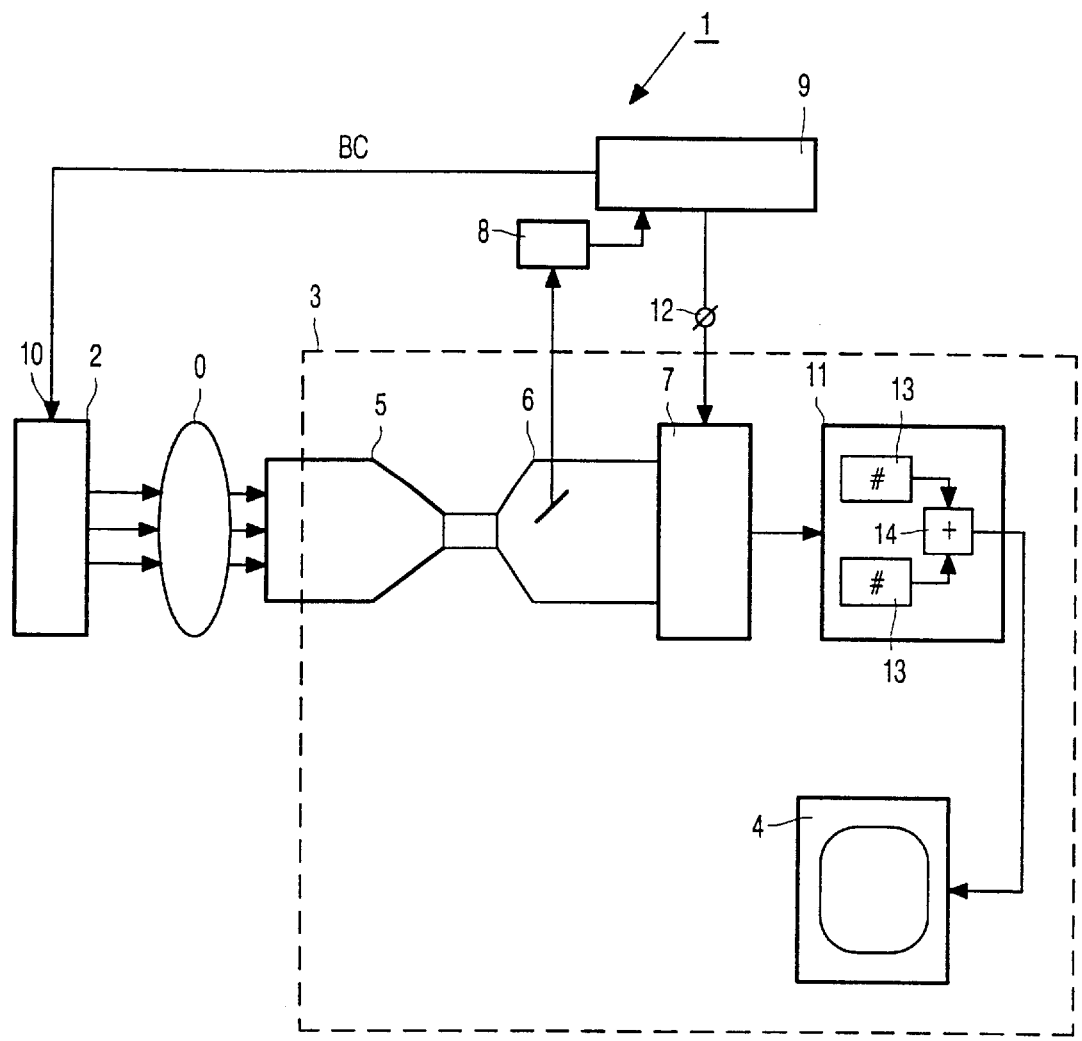

METHOD OF AND DEVICE FOR FORMING AN IMAGE OF AN OBJECT FROM PLURALITY OF IMAGES

BACKGROUND OF THE INVENTION

The invention relates to a method of forming an image of an exposed object.

The present invention also relates to a device for forming an image of an object, which device includes a source and an imaging device which is coupled to the source so as to produce the image.

A method and a device of this kind are known from EP-A-0 629 105. The cited document describes a device which includes a source, i.e. an X-ray source with an exposure control input, and an imaging device which includes an output which is connected to the exposure control input so as to form an image of the object. The image can be displayed on a display screen or monitor, for example, for medical examination purposes. During such examinations images can be formed of, for example, parts of the body or artificial parts (such as plates, screws, joints); the degree of radiation absorption then varies strongly within one and the same image. If in such cases the dynamic range of the imaging device is less than the intensity range of the image, the image quality will suffer, notably the contrast, in the parts of the image in which the radiation absorption is low or high. In addition to the local loss of quality in the image which is caused by a comparatively high noise level in parts with a high radiation absorption, the quality of the image as a whole is also degraded.

OBJECTS AND SUMMARY OF THE INVENTION

It is an object of the invention to provide a method and a device in which the described image quality problems are mitigated by taking comparatively simple steps.

To this end, the method according to the invention is characterized in that images of at least a part of the object are formed with different exposure levels, the differently exposed images being combined so as to form the single image; the device according to the invention is characterized in that the imaging device is arranged to form images of at least a part of the object with different exposure levels, and that the imaging device is provided with an image processor in which the differently exposed images are combined so as to form the single image.

It is to be noted that EP-A-0 655 861 discloses an image composition method and device in which substantially circular and spatially shifted images of an elongate object are merged so as to form an assembled image of the object. However, the cited document concerns neither the formation of images with different exposure levels nor the combination of such differently exposed images so as to form a single image.

The advantage of the method and the device according to the invention resides in the fact that, using a minimum of investments in hardware, software or control operations, high quality, high-contrast detail information with a large dynamic range can be achieved in a combined image by means of a device which has a limited dynamic range only. The detail information thus obtained has a brightness quality and a detail contrast which are comparable to those of an image obtained by means of a device which has a much larger dynamic range and hence is more complex and expensive than the device according to the invention.

Moreover, the perception of the image is enhanced because highly exposed regions, commonly occurring in prior images and extending to less exposed regions, no longer have a disturbing effect. Because of the absence of previously present saturation phenomena, due to highly absorbing, dark regions in the image, moreover, the signal-to-noise ratio in these regions is enhanced. Because the dynamic range of the combined image as a whole is also limited, the amplification in the video processor can be increased without adversely affecting the regions of low or high absorption in the images. This additionally leads to detail contrast enhancement upon display of the combined image.

A simple version of the method according to the invention which yields a significant improvement of the quality of the ultimate image is characterized in that the various exposure levels of the images are chosen in such a manner that they are compatible with the degrees of absorption of regions of the object to be imaged. This offers the advantage that the regions having a different radiation absorptivity, can be exposed, using correspondingly adapted different exposure levels of the images, in such a manner that an optimum quality in terms of detail contrast of the various regions is achieved in the ultimate combined image.

A further version of the method according to the invention is characterized in that the exposure levels of the images differ in that the periods of time during which the object is exposed by a source are different. The exposure times may overlap partly or not and may possibly commence at the same instant.

DESCRIPTION OF THE PREFERRED EMBODIMENTS

An embodiment of the device according to the invention is characterized in that the imaging device includes an image pick-up device which is connected to the image processor, the image processor being provided with storage means for the storage of the respective differently exposed images. The advantage of this embodiment resides in the fact that the images stored in the storage means need not be processed in real time but can be processed at any convenient later instant.

A further embodiment of the device according to the invention is characterized in that the storage means are arranged to store two (dual-exposure) or more (multi-exposure) types of images. The storage means are arranged notably to store two types of images, that is to say a first type of "low-light" image, having pixel values between approximately ⅛ of the mean pixel value and this mean pixel value, and a second type of "high-light" image which has pixel values between this mean pixel value and approximately eight times this mean pixel value. Diagnostically relevant information is thus contained in the images, on the one hand information concerning shutters and wedges being excluded whereas on the other hand mainly direct radiation is excluded beyond 8 times the mean pixel value.

Another embodiment of the device according to the invention, which offers advantages in terms of signal-to-noise ratio and reproducibility because no system errors are introduced is characterized in that the image processor includes summing/stacking means for combining the respective images so as to form the single image by the summing/stacking of their pixels.

A further embodiment of the device according to the invention is characterized in that the source includes an exposure input which is connected to the exposure control circuit in order to realize pulsed control of the source. Pulsed operation of the source not only limits the radiation dose applied to the object but, in cases where a CCD camera is used in the image pick-up device, it also prevents an image read out after the pulse from being affected by the known smearing effect.

These and other aspects of the invention are apparent from and will be elucidated, by way of example, with reference to the embodiment described hereinafter and the accompanying diagrammatic drawing.

BRIEF DESCRIPTION OF THE DRAWINGS

The sole Figure shows a device 1 for examining an object O by means of X-rays which originate from a source 2. The object O absorbs the radiation to a more or less high degree and an imaging device 3 forms an image thereof; such an image can be displayed, for example on a television screen or a monitor 4 of the imaging device 3. To this end, the imaging device 3 includes successively: a radiation detection and intensification device 5, a lens system 6 and an image pick-up device 7. The device 1 also includes a sensor unit 8 whereto a part of the optical signal formed in the lens structure 6 is applied in order to derive therefrom an exposure control signal BC for an exposure control circuit 9 of the device 1. The source 2 includes an input 10 whereto the exposure control signal BC is applied so that the exposure can be made on the basis of a desired exposure level.

The image pick-up device 7, which may include a Plumbicon, Saticon or, for example a CCD pick-up device, is arranged to form a plurality of images, for example but not necessarily two images, after respective exposure times and hence with different exposure levels. The degree of exposure of each of the two images is such that one image has an exposure level which is optimum for a region of the object with a low radiation absorptivity and the other image has an exposure level which is optimum for a region of the object with a high radiation absorptivity. In the case involving more than two images, the exposure levels are chosen in such a manner that they are compatible with the degrees of absorption of each of the desired regions to be imaged. The imaging device 3 includes an image processor 11 which is connected to the image pick-up device 7 and merges the images so as to form a single image in which, therefore, all regions which have been imaged in optimum exposure conditions are merged in a high-contrast manner. The image is then suitable for processing and analysis and can be displayed on the monitor 4.

The image pick-up device 7 of the embodiment of the device 1 shown includes a control input 12 whereto a control signal CS can be applied; this control signal constitutes an instruction to output the image formed thus far in the image pick-up device 7 to the image processor 11 so as to store it in one or more storage means 13 (separate or not). This instruction is issued at given instants by the exposure control circuit 9; in response thereto exposure levels, possibly preset or measured in given measuring fields, are adjusted in the image pick-up device 7. Sometimes the source 2 is driven in a pulsed manner by the exposure control circuit 9 and the various images will then be formed within a pulse period during which the object is exposed. The storage means 13 are arranged to store two or more types of images.

If the storage means 13 are arranged to store two types of images, that is to say a first or "low-light" type of image which has pixel values between approximately ⅙ of the mean pixel value and the mean pixel value, and a second type of "high-light" image which has pixel values between said mean pixel value and approximately 8 times said mean pixel value, information which is diagnostically irrelevant is excluded from the ultimate image. This is because pixels below ⅙ the mean pixel value contain (practically black) information concerning any shutters and wedges used whereas pixel values larger than approximately 8×said mean pixel value contain (practically white) direct radiation.

The images can be combined by the image processor 11, for example by means of electronic scissors or a mask so that a part cut from one image is filled in by the other image, after which the images are combined and hence the single combined image is formed. Masks can thus be derived from one or more images. In the case of dual exposure, the mask can be derived, for example from the one "low-light" image, from the other "high-light" image or, if desired, from a combination of in this case both images. The advantages that can thus be achieved are inter alia that the brightness range is reduced, so that the detail contrast can be enhanced. The merging or combining of the individual images so as to form the single image can be realized, for example by the summing or stacking of grey values of the pixels constituting each image. The two images are summed or stacked in a summing/stacking device 14 of the image processor 11; the electronic masking can then be performed as described above.

On the basis of a selected threshold value grey values of pixels of one image are compared with the threshold value during said cutting, and on the basis thereof they are electronically masked or not in order to select non-masked pixels for reproduction in the single image. Non-selected pixels are replaced by corresponding pixels from the other image.

In order to smooth (blurr) transitions between the one and the other images in the ultimate image without giving rise to usually annoying transitional phenomena, if desired, pixels in the vicinity of the transitions can be averaged out (blurred). If desired, this operation can also be performed on so-called contrast images in which importance is attached to a high-quality reproduction of interfaces between, for example bone and tissue.

To those skilled in the art it will be evident how to realize masks in various manners, for example for application to the two images, followed by merging so as to obtain the single image. After acquisition of the high-light and the low-light image, a mask can be formed by "thresholding" a high-light image and subsequently blurring it, after which the combination of the two images is performed on the basis of the mask. The ultimate image can be intensified and, if desired, subjected to noise reduction and contour enhancement techniques. After the acquisition of the two images, a mask could be formed during an additional step by summing the two images and by subsequently "thresholding" and "blurring" these images, followed by further combination and processing as described above.

If the image pick-up device 7 includes a CCD camera which is read out during the X-ray pulse from the source 2, the so-called smear effect occurs in notably the dark regions of the image. Because upon combination of the two images the dark regions in the high-light image are replaced (in the described manner) by the other, low-light image formed of the more absorbing part of the object, the described method reduces the smear effect in the ultimate combined image. This holds for a source 2 which operates continuously as well as for a source operating in a pulsed manner. In the case of a CCD camera which is exposed in a pulsed manner, images are usually transported out of the CCD camera after the termination of the X-ray pulse, so that no smear effect occurs.

The CCD camera could also utilize in known manner a rotating wedge which is arranged in front of the camera in order to reduce the disturbing effects of smearing. If the source 2 is operated in a pulsed manner and the exposure control circuit 9 applies an instruction to the source 2, after termination of the control pulse BC, so as to read out the last image and apply it to the image processor 11, due to the absence of exposure during the reading out of the CCD camera, no smear effect will occur in the last image read out. The dark regions in the previously read out, strongly exposed image, in which the annoying smear effect occurs, are replaced in the described manner by corresponding pixels from the low-light image. This automatically eliminates the smear effect from the combined image, without a rotating wedge being required for this purpose.

In addition to the described technique for blurring transitions between the constituent images in the single image by the image processor, image processing techniques which are known per se can be applied. Examples in this respect are: enhancement of signal-to-noise ratios in the images and enhancement of contours in the single image.

The exposure control circuit 9 can also adjust, as part of the control signal BC, an optimum high voltage (kV) setting of the source 2 per image formed, thus ensuring that relevant details in the images are reproduced with an optimum brightness and a high contrast.

Evidently, more than two (multi-exposure) images, formed in different conditions or not, such as different exposure times, could also be combined so as to form a single image. Every combination of images exposed for a shorter or longer period of time is also possible. In addition, images can be combined which have been formed with different kV settings of the source 2. Moreover, the measuring fields can be chosen, manually or mechanically, but in an intelligent manner, so that the position of the patient becomes less critical. Furthermore, a set of images can be acquired, for example during one or more X-ray pulses, for which variable or fixed exposure ratios of, for example ¼, ½, 1, 2, 4 can be used. Such a set of images is preferably acquired by means of the so-called progressive scan technique. The progressive scan technique is known per se from U.S. Pat. No. 4,017,679. This method can be applied very well in conjunction with pick-up devices such as a Plumbicon or a Saticon pick-up tube. After the formation of the images, during a post-processing operation the best set of images can be determined in order to assemble the ultimate image. In order to enhance the signal-to-noise ratio, a plurality of equally exposed images can be combined so as to form a first image, and other equally exposed images can be combined so as to form a second image, the first and the second image then being combined so as to form the ultimate single image.

What is claimed is:

1. A method of forming a single image of an exposed object, wherein images of at least a part of the object are formed with different exposure levels, the differently exposed images being combined so as to form the single image, and wherein the different exposure levels are adjusted in accordance with an exposure control signal generated in an exposure control circuit utilizing part of each optical image of the exposed object.

2. A method as claimed in claim 1, wherein the different exposure levels of the images are chosen to be such that they are compatible with the degrees of absorption of regions of the object to be imaged based on said exposure control signal.

3. A method as claimed in claim 1, wherein the exposure levels of the images differ in that the periods during which the object is irradiated by a source differ, based on said exposure control signal.

4. A device for forming an image of an object, which device includes a source and an imaging device which is coupled to the source in order to form the image, wherein the imaging device is arranged to form images of at least a part of the object with different exposure levels, wherein an exposure control circuit is included in the imaging device for generating an exposure control signal for controlling said different exposure levels, and wherein the imaging device further includes image processor in which the differently exposed images are combined so as to form the single image.

5. A device as claimed in claim 4, wherein the imaging device is provided with an image pick-up device which is connected to the image processor and includes a control input for receiving a control signal from the exposure control circuit, the image processor further includes a storage means for storing the respective differently exposed images.

6. A device as claimed in claim 5, wherein the storage means are arranged to store two or more types of images.

7. A device as claimed in claim 5, wherein the storage means are arranged to store two types of images, a first "low-light" type of image which has pixel values between approximately ⅛ of the mean pixel value and the mean pixel value, and a second "high light" type of image which has pixel values between this mean pixel value and approximately eight times this mean pixel value, wherein said low-light and high-light signals are directed by said control signal.

8. A device as claimed in claim 4, wherein the image processor is provided with summing/stacking means for combining the respective images so as to form the single image by the summing/stacking of their pixels.

9. A device as claimed in claim 4, wherein the device includes an image pick-up device provided with a control input which is connected to the exposure control circuit and can receive a control signal which constitutes an instruction for the transfer of the respective images to the image processor.

10. A device as claimed in claim 9, wherein the source is provided with an exposure input which is connected to the exposure control circuit in order to control the source in a pulsed manner.

11. A device as claimed in claim 4, wherein the image pick-up device includes one of: a Plumbicon tube, a Saticon tube and a CCD sensor.

12. A device as claimed in claim 4, wherein the image processor is arranged to perform image processing techniques, such as the blurring of transitions between the images, the enhancement of signal-to-noise ratios in the images, and the enhancement of contours in the image.

13. A device as claimed in claim 4, wherein each of the images is formed with one of: an optimum high-voltage setting and exposure time of the source utilizing said exposure control signal.

* * * * *